United States Patent
Anderson et al.

(10) Patent No.: US 7,128,355 B1
(45) Date of Patent: Oct. 31, 2006

(54) SIDE ACCESS TRUCK RACK AND SYSTEM

(76) Inventors: Peter Christian Anderson, 763 Grace Rd., Frankfort, MI (US) 49635; Christopher Timothy Liss, 1343 E. Ducklake Rd., Grawn, MI (US) 49637

(*) Notice: Subject to any disclaimer, the term of this patent is extended or adjusted under 35 U.S.C. 154(b) by 0 days.

(21) Appl. No.: 10/865,205

(22) Filed: Jul. 19, 2004

(51) Int. Cl.
*B60P 1/02* (2006.01)
*B60R 9/00* (2006.01)

(52) U.S. Cl. .......................... 296/3; 224/405; 414/470; 414/471

(58) Field of Classification Search .................. 296/3, 296/7, 14, 32; 224/405, 403, 553; 414/470, 414/471, 486, 462
See application file for complete search history.

(56) References Cited

U.S. PATENT DOCUMENTS

| | | | |
|---|---|---|---|
| 1,979,809 A * | 11/1934 | Newton | .................... 224/42.13 |
| 4,152,020 A | 5/1979 | Brown | |
| 4,378,127 A | 3/1983 | Rossi | |
| 4,585,264 A | 4/1986 | Miller | |
| 4,770,458 A | 9/1988 | Burke | |
| 4,824,157 A * | 4/1989 | Nielsen et al. | .......... 296/100.01 |
| 5,303,858 A | 4/1994 | Price | |
| 5,431,472 A | 7/1995 | Coffland | |
| 5,628,540 A | 5/1997 | James | |
| 5,662,254 A * | 9/1997 | Lemajeur et al. | ............ 224/405 |
| 5,829,812 A * | 11/1998 | Gionta | ............................ 296/3 |
| 6,874,835 B1* | 4/2005 | Silverness | ........................ 296/3 |
| 2003/0201656 A1* | 10/2003 | Ferguson et al. | ............... 296/3 |

* cited by examiner

*Primary Examiner*—Dennis H. Pedder
(74) *Attorney, Agent, or Firm*—Robert L. McKellar; McKellar IP Law, PLLC (57) ABSTRACT

The present invention is a side access hinging truck bed rack. The device pertains primarily to a pickup truck bed rack that allows for easy loading, unloading, and securing of cargo at shoulder level through a rotating hinge mechanism. In the present invention a pair of stationary side rails, both having an inverted U-shape, are fixed parallel to each other upon the upper rims of the longitudinal sidewalls of the truck bed, so that that one of the stationary side rails is above the front wall while the second stationary side rail is above the back tailgate. A hinge at each end of the two stationary side rails pivotally attaches two inverted U-shaped side arm rails. Attached to each of the side arm rails are shelf rack rails. The shelf rack rails rest flatly upon the top of both stationary side rails when in a closed secure position. When the present invention is in this position the side arm rails rest in an upward pointing stance alongside the stationary side rails.

The racking system provides access into the bed area of the truck without having to reach below the plane of the side walls of the truck bed. Making the system more efficient as well as safer by the fact it is ergonomically correct.

7 Claims, 6 Drawing Sheets

SIDE ACCESS TRUCK RACK AND SYSTEM

FIELD OF THE INVENTION

The present invention relates to a side access hinging truck bed rack, and more particularly, to a pickup truck bed rack that allows for easy loading, unloading, and securing of cargo at shoulder level through a rotating hinge mechanism.

BACKGROUND OF THE INVENTION

Utility pick up trucks have been traditionally used by plumbers, electricians, painters, roofers, lumberjacks, and similar artisans to hold and transport long materials, such as pipes, ladders, sheets of plywood, etc. A typical pickup truck includes a cab with a cargo flat bed rearward of the cab. The truck bed consists of a floor, front wall, two parallel longitudinal sidewalls, and a back tailgate that forms a cargo holding area. Although large cargo may be stored in a flat bed of such design, more cargo carrying space can be utilized if an overhead truck bed rack is employed to support cargo in a raised position above the truck bed.

Using a truck rack enables users to store items in the truck bed in addition to on top of the rack, as well as to stow long objects, such as lumber, which may be longer than the truck bed, and thus not being suitable to be hauled in the truck bed. Unfortunately, using a truck rack means that the user must be capable of reaching the level of a truck rack, which is typically well above the shoulder height of the user. Lifting heavy objects onto a truck rack is oftentimes too difficult for the user.

Moreover, pickup trucks are much more common on the road than in past years. Pickup trucks have traditionally been viewed as rugged utility vehicles capable of conquering any rough terrain and have been employed by craftsmen for some type of utility function; yet, in recent years, pickup trucks have experienced a surge in popularity and have become acceptable as passenger vehicles as well as utility vehicles. Pickup trucks account for over 20% of all vehicles sold in the US. Trucks have even become family vehicles; some complete with four doors and rear seats. Although once rugged, pickup trucks have been transformed into stylish vehicles for general use and, as a result, a need for increased carrying space has become just as important as retaining the capability of a utility truck function. Families find that they need more than just the space within a truck bed floor to place items. Running boards, tailgate protectors, attractive grilles, and mud flaps help to make a pickup truck more friendly for the average driver; and similarly, truck racks make packing in a truck that much more space effective for the average driver.

The relevant art shows an assortment of truck bed racks created in attempts to provide users with more space aside from that which the truck bed offers. However, these devices do not offer versatility, quick shoulder-level loading and unloading, auto folding, nor the ability to increase storage capacity beyond the length and width of the truck bed.

U.S. Pat. No. 5,431,472 that issued to Ronald G. Coffland on Jul. 11, 1995, shows a truck rack with foldable side rails for truck beds. Unlike the present invention, Coffland's device contains supporting cross bars disposed above the truck that do not provide a surface for resting luggage upon. In addition, Coffland's device cannot automatically raise stored goods as weight is disposed upon it.

U.S. Pat. No. 4,585,264 that issued to Roger Miller on Apr. 29, 1986, is merely a fence type structure that follows the four sides of a truck bed. Unlike the present invention, Miller's device is incapable of shifting stored goods from an accessible loading position to a higher storage position.

U.S. Pat. No. 4,770,458 that issued to Steven R. Burke on Sep. 13, 1988, shows a device unlike the present invention that is of a bulky configuration. Such a bulky configuration, resembling pigpen structures when attached to a pickup truck, cannot be removed without significant difficulty. Also, unlike the present invention, Miller's device is incapable of shifting stored goods from an accessible loading position to a higher storage position.

U.S. Pat. No. 4,152,020 that issued to William D. Brown on May 1, 1979, shows a rack for a pickup truck with four corner posts supported by steel angled bed rails stretching the full length of the truck bed and U.S. Pat. No. 5,476,630 that issued to Ron S. Berkich on Dec. 19, 1995, shows a truck rack that mounts to the bed of a truck, which includes components for adjusting the height and extent for supporting loads. Yet, unlike the present invention, these devices lack a hinge component, which will enable easy loading and unloading of cargo at a shoulder level.

U.S. Pat. No. 4,378,127 that issued to Benedict A. Rossi, Sr. on Mar. 29, 1983, shows a rack comprising a set of upright posts supported by a horizontal base plate, yet unlike the present invention, this device is adapted to be installed solely in combination with a shell in the bed of a pickup truck.

U.S. Pat. No. 5,628,540 that issued to William L. James on May 13, 1997, shows an adjustable rack mounted on small or midsize pickup trucks, yet unlike the present invention, this device contains a telescoping component that allows the rack to expand and elevate. Such racks utilizing a telescoping adjustment system often are less sturdy than racks containing single-pieced rigid members.

U.S. Pat. No. 5,303,858 that issued to Brent A. Price on Apr. 19, 1994, and U.S. Pat. No. 5,699,945, show truck racks to be mounted on the top of truck beds; yet unlike the present invention, these devices are designed solely for holding bicycles above truck beds, and would not serve any function for stowing other larger objects such as lumber, pipes, etc.

Thus, there is a need for an invention that provides a truck bed rack that is convenient for loading, unloading, and securing cargo by providing side access at shoulder level. Further, there is a need for a device that moves loaded cargo to a higher position above the truck bed.

SUMMARY OF THE INVENTION

The present invention improves upon the devices of the cited patents by being easy and convenient to use, ergonomically ideal for the everyday user, and containing secure safety features.

The present invention is for use with a truck bed, and it provides side space access for use above the bed of a pick up truck. A typical pickup truck includes a cab and rearward of the cab is a cargo flat bed, which contains a floor, front wall, two parallel longitudinal side walls, and a back tailgate.

In the present invention a pair of stationary side rails, both having an inverted U-shape, are fixed parallel to each other upon the upper rims of the longitudinal sidewalls of the truck bed, so that that one of the stationary side rails is above the front wall while the second stationary side rail is above the back tailgate. A hinge to each end of the two stationary side rails pivotally attaches two inverted U-shaped side arm rails. Attached to each of the side arm rails are shelf rack rails. The shelf rack rails rest flatly upon the top of both stationary side rails when in a closed secure position. When the present invention is in this position, the side arm rails rest in an upward pointing stance alongside the stationary side rails.

In order to load cargo upon the present invention, the side arm rails are pulled in a downward direction. Such action causes the side arm rails, in addition to the shelf rack rails, to rotate around the hinges located on each of the ends of the two stationary side rails, and to stop at a shoulder level position giving side access for easy loading. Cable stops are employed so the shelf rack rails, attached to the side arm rails, do not rotate too far down to damage the vehicle or the devices or systems.

Due to the design of the present invention, the weight of the cargo can be more than what a user could lift overhead, yet the cargo can still be easily in place on top of the shelf rack rails and then moved to sit atop the present invention. Thus, the present invention is ergonomically ideal for the everyday user. The design of the present invention allows for utilization of the leverage and gravity of the cargo to help in placing the side arm rails in a travel/stow position. Once the center of gravity crosses the rotation point, the shelf rack rail will close by itself making it much easier as well as safer for the user to load cargo. When in the stowed position, such that the side arm rails sit atop the stationary side rails, secondary restraints are applied before traveling to secure side arm rails firmly to avoid having the side arm rails deploy outward.

Thus, there is described a rack for a truck bed, comprising a first bar, attached to a first side wall of the truck bed and a first pivoting mechanism, in communication with said first bar. The first bar rotates downwardly from the first sidewall of the truck.

In another embodiment, there is described a rack for hauling cargo, the rack comprising a front vertical post and a back vertical post, wherein each vertical post has a near end and a distal end and each vertical post is capable of being pivotally mounted at the distal end, to the top of a side wall of the bed of a truck.

In addition, there is a carrier segment, wherein the carrier segment is comprised of a rectangular frame comprising an inside long rail and an outside long rail. Each rail has a back end and a front end and each long rail is attached in the same plane with a front end rail and a back end rail. The carrier is attached near the back end of the long outside rail near the near end of the back vertical post and attached near the outside long rail front end with the near end of the front vertical post. There is mounted on top of the outside long rail, near the point of the attachment of the front vertical post and the back vertical post to the outside carrier rail, a shelf rack rail mounted essentially perpendicular to the plane of the carrier segment.

Further, another embodiment of this invention is a combination of a rack just described above, and a set of self-supporting stabilizer units, wherein the stabilizer units are comprised of a set of front vertical stabilizer bars and a set of back vertical stabilizer bars, wherein each said vertical stabilizer bar has a near end and a distal end, the front stabilizer bars being mounted at the distal end, to the top of a side wall of a bed of a truck, the back vertical stabilizer bars being removably mounted at the distal end, to the top of a side wall of the bed of a truck.

The front stabilizer bars are attached, at their respective near ends, to each other by a first horizontal cross bar between them and the back stabilizer bars are attached at the near end to each other by a second horizontal crossbar between them.

Yet another embodiment of this invention is a combination of a set of racks as described just above, that are mounted to the top of opposed sidewalls of a truck and that oppose each other in position to constitute a left rack and a right rack.

Still further, there is a combination a set of racks as described just above, and a set of self-supporting stabilizer units. The stabilizer units are comprised of a set of front vertical stabilizer bars and a set of back vertical stabilizer bars, and each vertical stabilizer bar has a near end and a distal end, the front stabilizer bars being mounted at the distal end, to the top of a side wall of a bed of a truck, the back vertical stabilizer bars being removably mounted at the distal end, to the top of a side wall of the bed of a truck.

The front stabilizer bars are attached, at their respective near ends, to each other by a first horizontal cross bar between them. The back stabilizer bars are attached at the near end to each other by a second horizontal crossbar between them.

Going to another embodiment of this invention, there is a primary retainer mechanism for the combination set forth just above, the retainer mechanism comprised of a latch bolt mounted on at least one vertical post and a flat, planar latch, the flat, planar latch having a near end and a distal end. The flat, planar latch is rotatably mounted at the near end on at least one vertical post of the self-supporting stabilizer unit at the same approximate location as the latch bolt mount on the vertical post, the flat, planar latch having a modified hook configuration cut through the flat plane thereof near the distal end. The flat, planar latch is spring loaded such that when the distal end of the flat, planar latch strikes the latch bolt, the flat, planar latch raises up and over the latch bolt and the spring returns the flat, planar latch to a resting, locked position over the latch bolt. Thus, the latch is a self-latching latch.

Going still farther, there is an embodiment that is a security unit for the combination as described just above comprising a retainer mechanism and a secondary restraint.

A further embodiment of this invention is a method of unobstructive loading of cargo on a truck, the truck having the combination of at least one of the racks and the stabilizer bars described above, the method comprising unlocking the restraining system from the rack; lowering the rack from a vertical position; removing the back stabilizer bar; loading the bed of the truck with cargo; replacing the back stabilizer bar; raising the rack to a vertical position and locking said rack in place, and optionally loading cargo on the rack.

Another embodiment of this invention is a method of unobstructive unloading of cargo from a truck, the truck having at least one rack and the stabilizers bars described above, the method comprising unloading any cargo from the rack; unlocking the restraining system from the rack; lowering the rack from a vertical position; removing the back stabilizer bar; unloading the cargo from the bed of the truck.

DETAILED DESCRIPTION OF THE INVENTION

Figure 1:
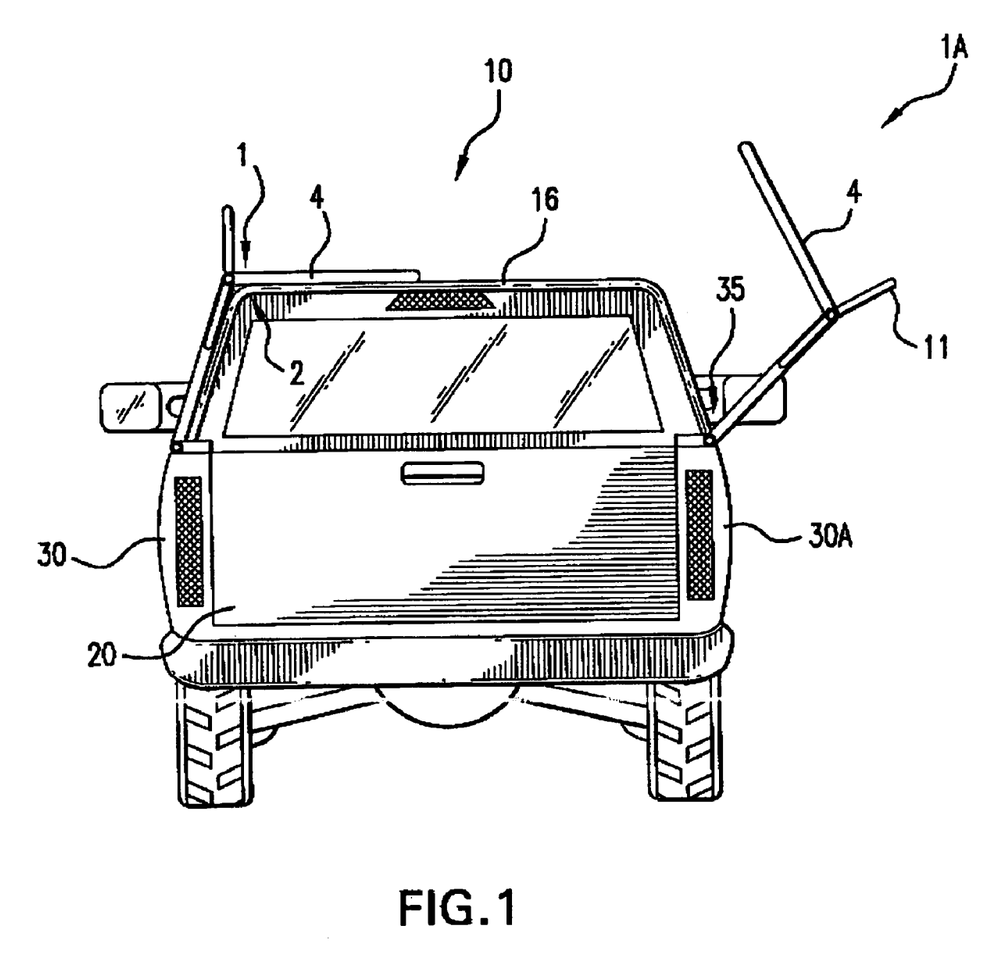
FIG. 1 shows a full rear view of the present invention mounted on the bed of a pickup truck.

Referring now to FIG. 1, there is shown one embodiment of this invention that is a device 1 (a rack) of this invention wherein there is shown a full rear end 20 view of a pickup truck 10 on which there is mounted the device 1. Also shown are the sidewalls 30 and 30A. In this Figure, on the left side of the Figure, there is shown the device 1 in a resting position on the rear horizontal stabilizer bar 2 and the front horizontal stabilizer bar 3 (cannot be observed in this Figure, see FIG. 4), and on the right hand side, is shown an essentially identical device 1A that has been pulled downwardly and away from the stabilizer bars 2 and 3. In this Figure, there is shown the devices 1 and 1A consisting of a carrier segment 4 laying in a horizontal position atop the stabilizer bars 2 and 3.

Figure 2:
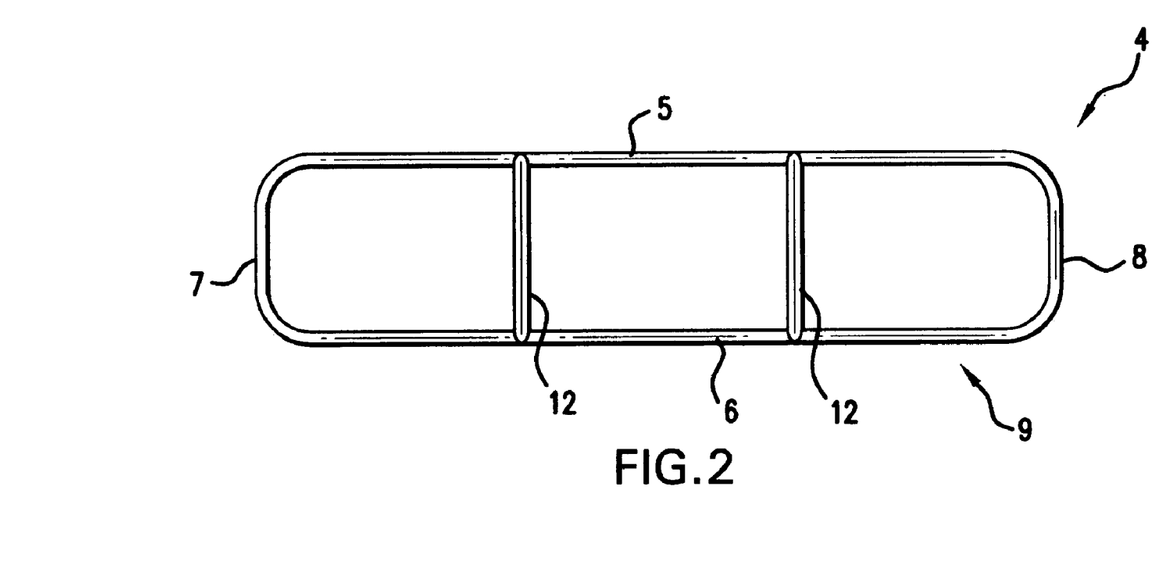
FIG. 2 shows a full top view of a device of the present invention.

Making reference to FIG. 2, there is shown a full top view of a carrier segment 4 showing two parallel, spaced apart rails, the outside long rail 5 and the inside long rail 6, that are capped on each end by a front carrier end cap 7 and a back carrier end cap 8, all of which are attached together to form an essentially unitary, rectangular, open platform 9 that is intended to carry cargo. As shown in FIG. 2, one or more cross braces 12 can be used to help stabilize the open platform 9.

Figure 3:
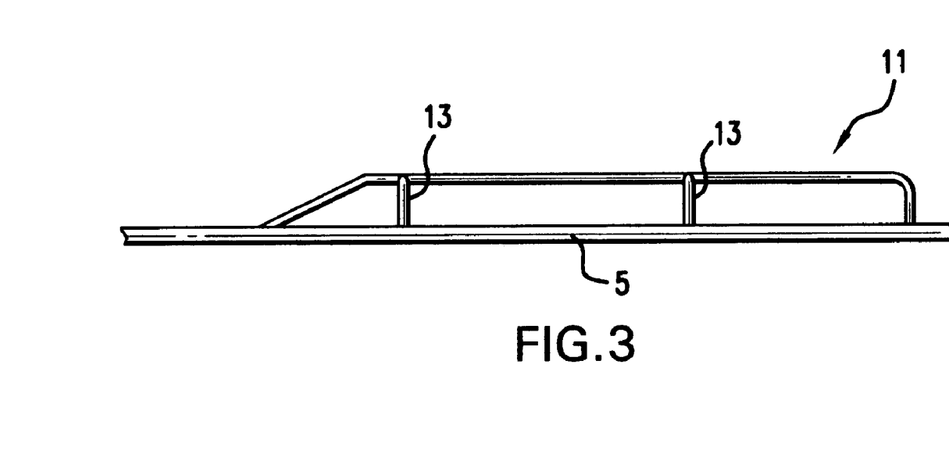
FIG. 3 shows a full side view of a side rail of the carrier segment of a device of this invention.

FIG. 3 is a side rail 11 for the carrier segment 4 and is mounted vertically on the outside long rail 5 (a portion of which is shown in this Figure). It should be noted that the side rail 11 does not have to be of the same length as the outside long rail 5, but can be shorter, or longer, according to the type of cargo that is anticipated as being loaded on the carrier segment 4. It should be noted that the side rail 11 may have one or more cross braces 13 to help stabilize the side rail 11.

Figure 4:
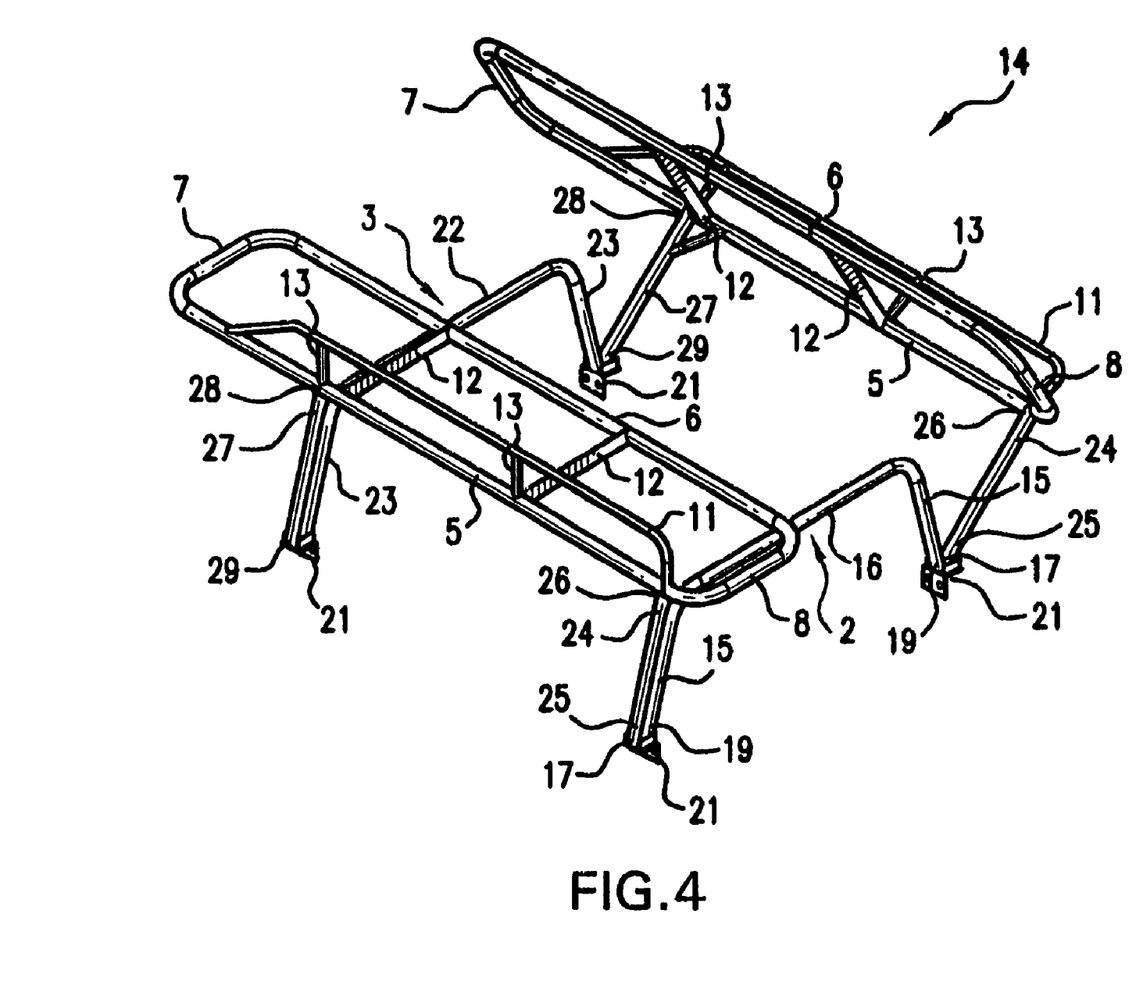
FIG. 4 shows a full view in perspective of a system of this invention showing two full stabilizer bars and two full devices of this invention, one resting on the stabilizer bars and the other in a position lowered from the horizontal.

Turning now to FIG. 4, which is a full view n perspective of a full system 14 of this invention, there is shown a device 1 and device 1A, two carrier segments 4, outside long rails 5, and inside long rails 6, front end caps 7 and back end caps 8, cross braces 12 and cross braces 13. In addition, there is shown in detail, the rear stabilizer bar 2 in which there is shown two support bars 15 and a horizontal cross bar 16. The rear stabilizer bar 2 can be of unitary construction, or can be put together in several pieces, for example, one cross bar 16 and two support bars 15 that are slidable one into the other.

Figure 5:
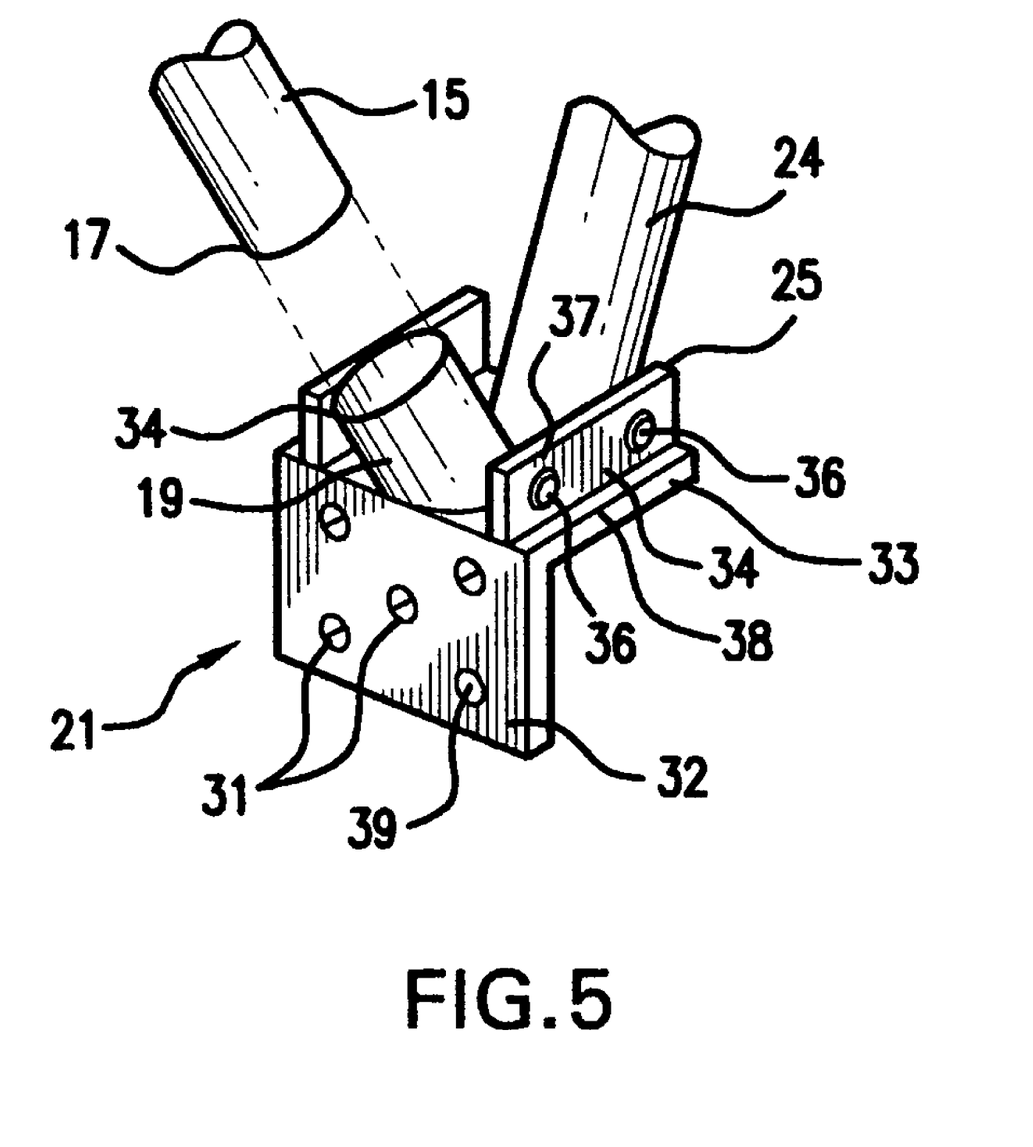
FIG. 5 is a full view in perspective of the mounting system for the invention.

The support bars 15 each have a distal end 17, by which the stabilizer bars 15 are mounted to the sidewalls 20 and 30A. In one embodiment of this invention, the mounting of the stabilizer bar 2 can be such that the rear stabilizer 2 can be easily demounted. For purposes of illustration, shown at points 18, are cups 19 that are fixedly attached to mounting plates 21, the detail of which is shown in FIG. 5.

The support bars 15 distal ends 17 are slidable into the close fitting cups 19 and thus, when it is desired to remove the rear stabilizer bar 2 to load or unload cargo, then it can simply be pulled from the cups 19 and laid aside.

There is also shown in detail the front stabilizer bar 3, which is almost identical to the rear stabilizer bar 2, in that it is comprised of one horizontal cross bar 22 and two essentially vertical support bars 23. The front stabilizer bar 3 can also be removed, for example when it is desired to remove the entire system from the truck for the loading or unloading of certain types of cargo in which the system is not needed.

Turning now to the carrier segment 9, there is shown in FIG. 4, right hand side, in addition to those components described supra, a set of vertical support bars 24 for the carrier segment 9, that have a distal end 25, and a near end 26. The carrier segment 9 is fixedly attached to the near end 26 of the vertical support bars 24. The distal end 25 of the vertical support bars 24 are configured such that they are movable in an up and down motion with respect to the vertical stabilizer support bars 15 and 23.

Likewise, with reference to the front of the system, there is shown the vertical support bars 27 for the carrier segment 9. They are attached at their near ends 28 to the outside rail 5 of the carrier segment 9, and are attached to the mounting plates 21 at their distal ends 29. The vertical support bars 27 are also rotatably mounted to the mounting plate 21.

Turning now to FIG. 5, there is shown an enlarged view of the distal ends 17 and 25 of a portion of the rear stabilizer vertical support 15 and a portion of the rear vertical support bar 24 and their attachment to the mounting plate 21 wherein there is shown fasteners 31 for fastening the mounting plate 21 to the side wall 30 or 30A of the truck 10. The mounting plate 21 comprises an inside wall plate 32, a topside plate 33, and vertical support plates 34. The inside wall plate 32 has two or more openings 39 that match a complimentary set of such openings through the side walls 30 and 30A (not shown) of the truck 10, through which the fasteners 31 are inserted. Such fasteners 31 are not critical, just as long as they will support and retain the mounting plate on the sidewalls 30 and 30A of the truck 10 and support any cargo load that is loaded thereon. As shown, they are bolts.

The mounting plate 21 has a topside plate 33 that is integrally fastened at essentially a ninety degree angle to the inside wall plate, that is placed on the top 35 (FIG. 1) of the side walls 30 and 30A and securely mounted to the side walls 30 and 30A similar to the fastening of the inside wall plate 32. Finally, there are two vertical support plates 34 that are mounted some distance apart to accommodate the cups 19 and the distal end 25 of the vertical support bars 24 therebetween. The cups 19 and the vertical support bars 24 are rotatably mounted such that a pins 36 are inserted through openings 37 and 38 through the vertical support plates 34 to hold the cups 19 and the vertical support bar 24 to the mounting plate 21. Both the cups 19 and the vertical support bars 24, and their counterparts at the front of the system can be mounted rotatably, however, it is imperative that at least the vertical support bars for the carrier segments 9 be so mounted.

What is meant by "rotatably" herein is that the vertical support bars cannot be rotated a full 360° but can only be rotated to a certain degree around pins 36, because of the impedance of one support bar to the other, that is the ability of the vertical support bars for the stabilizers to prevent the forward movement of the vertical support bars of the carrier segments 9 into the bed of the truck 10, and due to the placement of a restraining device 40 to prevent the carrier segment 9 from dropping below a certain level, all of which is set forth in detail infra.

Figure 6A:
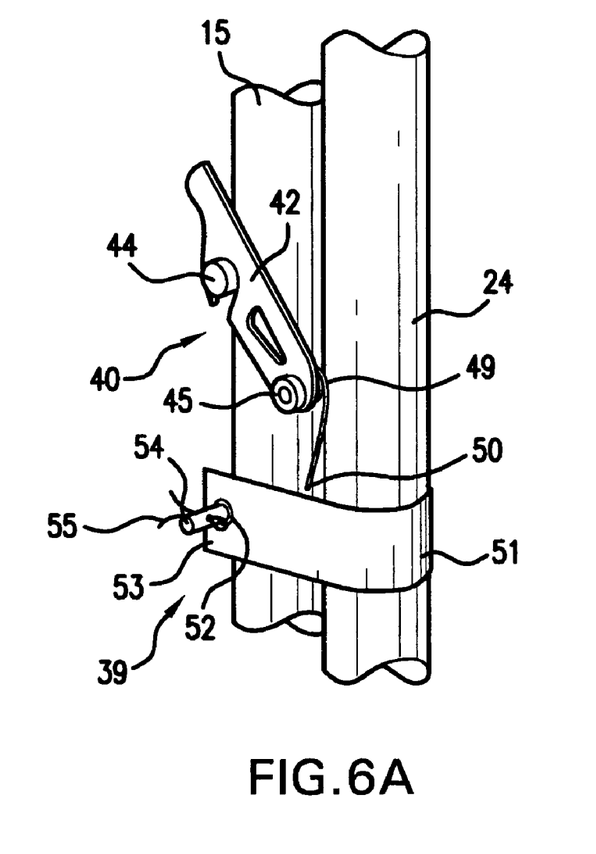
FIG. 6A is a full view in perspective of the primary and secondary restraints of the invention, in combination.
Figure 6B:
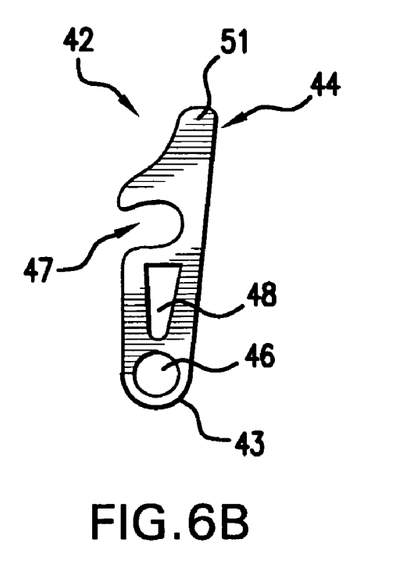
FIG. 6B is a full side view of the flat, planar latch plate that is part of the primary restraint system.

Turning now to FIG. 6A, which is a view of a portion of a vertical support bar 24 and a portion of a vertical support bar 15, to which is attached a portion of the restraint system of this invention. Thus, shown is a primary restraint 39 that is comprised of a latch stop bolt 41 mounted on the vertical post 15, and a flat, planar latch plate 42. FIG. 6B is a full front view of the flat, planar latch plate 42 showing a near end 43 and a distal end 44. At the near end 43 is an opening 46. The flat, planar latch plate 42 is rotatably mounted at the near end 43 using a support bolt 45 that is attached to the vertical support bar 24 by inserting the support bolt 45 through the opening 46 and into an opening in the vertical support bar 24 (not shown). The shoulder bolt 45 is fastened by any conventional means, such as screw threads (not shown), or by being bolted to the vertical support bar 24, or by adhesive means, or by any other convenient means.

As shown, the plat, planar latch plate 42 has a notch 47 near the distal end 44. The opening 48 in the body of the flat, planar latch plate 42 is a design feature and does not need to be employed in the flat, planar plate 42. With reference to FIG. 6A, there is also shown a torsion spring 49, that is anchored by support of an anchoring end 50 to the face of the vertical support bar 15. It is not necessary to physically attach this anchoring end to the vertical support bar 15, but it can be so fastened. As the flat, planar latch plate 42 is moved towards and past the vertical support bar 24, the spring 49 is compressed and when the vertical support post 24 is moved to the vertical support post 15 and the flat, planar latch plate strikes the latch stop bolt 41, the distal end 44 of the flat, planar latch plate 42 raises up and over the latch stop bolt 41 and drops into the notch 47 and locks the vertical support bar 15 and the vertical support bar 24 together.

When the carrier segment 9 is to be lowered, the operator pulls the handle 51 of the flat, planar latch plate 42 to raise the flat, planar latch plate 42 up and over the latch stop bolt 41 to release the flat, planar latch plate 42.

Also shown in FIG. 6A is a secondary restraint 39, which is optional in use, and can be used, for example, while a cargo is in transit. The secondary restraint 39 is comprised of a simple U-shaped collar 51 that is deep enough to enclose both the vertical support bar 15 and the vertical support bar 24 and extend past both vertical support bars in order to lock the U-shaped collar 51 in position. For this purpose, there is provided openings 52 in the terminal ends 53 of the U-shaped collar 51, and a pin 54 is inserted therethrough and locked in place, for example using a cotter pin 55, to prevent the release of the U-shaped collar 51.

Figure 7:
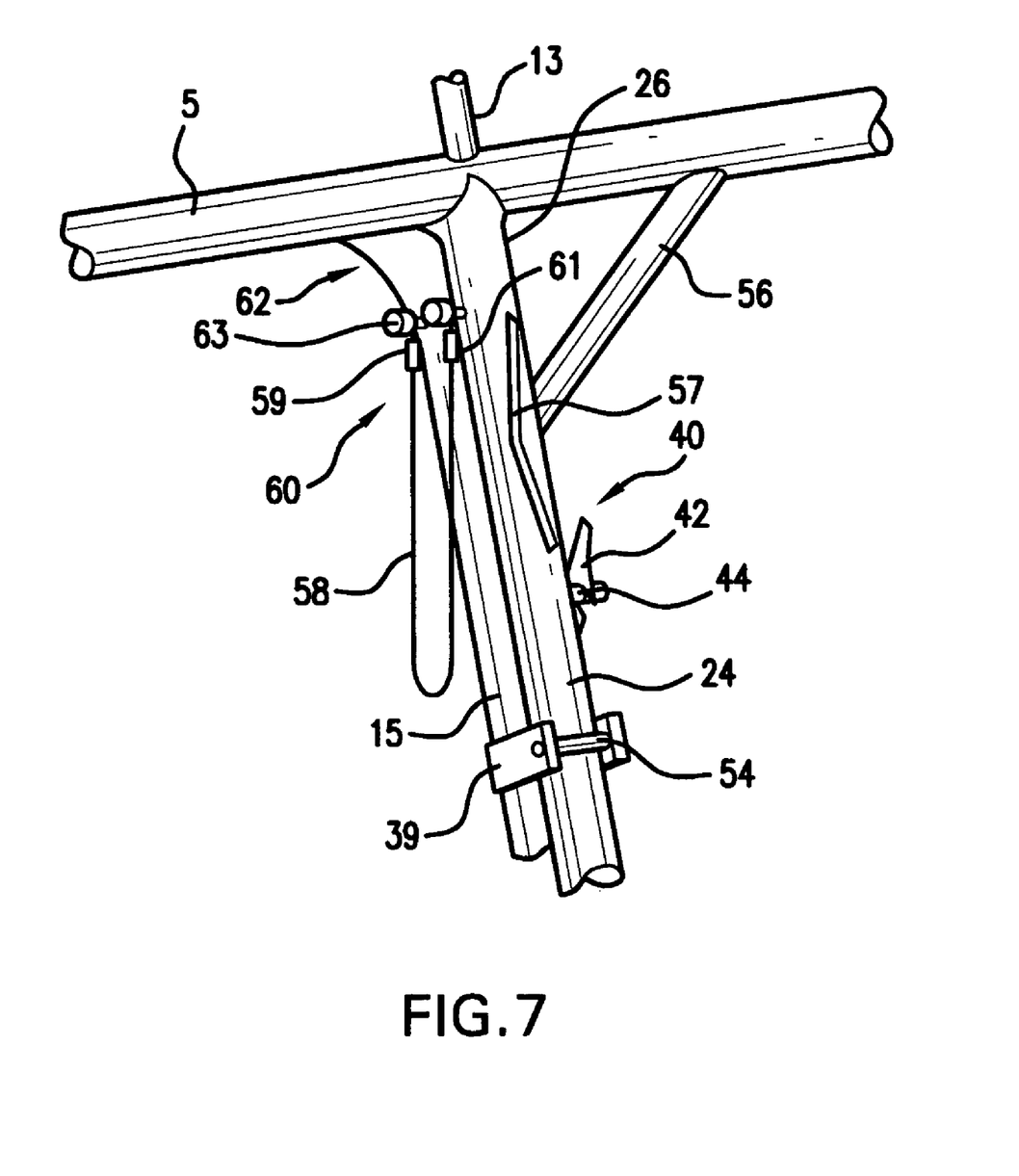
FIG. 7 is a portion of the invention showing the combination of the primary, secondary, and tertiary restraint systems.

Turning now to FIG. 7, there is shown an arrangement of the restraints of this invention in addition to a tertiary restraint that is used to prevent the rack (device 1) from being lowered too far down. Thus shown are a portion of the carrier segment 9 comprised of a horizontal outside rail 5, a cross brace 13 for the rail 11 (not shown), a portion of the primary restraint 40 showing the latch stop bolt 41, a portion of the flat, planar latch 42, a gusset 56 to brace the outside support bar 5 and the vertical support post 24, a cleat 57 for tying off cords or ropes, a portion of the secondary restraint 39, with pin 54, and, a portion of the vertical support bar 15.

The tertiary restraint is a cabled restraint 60 comprised of a cable 58 that has two ends 59 and 61. The end 59 is attached to the vertical support bar 15 near the near end 62 of the vertical support bar 15. This attachment is through the use of a headed bolt 63 that allows a loop in the end 59 to be rotatably attached to the vertical support bar 15.

The other end of the cable 58, that is 61 is attached to the near end 26 of the vertical support bar 24 and is attached the same as for the end 59.

In use, the secondary restraint 39 is removed by removing pin 54. Next, all of the primary restraints 40 on a side are unlocked and the device 1 is lowered to the extent that the tertiary restraint 60 will allow. The same is done for the device 1A on the other side of the truck 10. Thereafter, the rear stabilizer bar 2 is removed and then the cargo can be loaded or unloaded.

Thereafter, if cargo is loaded, the rear stabilizer bar 2 is replaced, the devices 1 and 1A are moved to the upright position and then allowed to latch, and then the secondary restraint 39 can be put into place on each side.

The length and height of the devices of the present invention are large enough to secure large cargo in an elevated position above the truck without hindering the overall appearance of the truck. The rotation action utilized allows the apparatus to be compact and avoid a bulky configuration that detracts from the appearance of the truck.

Ergonomics of the present invention are ideal for the everyday user because the apparatus is pleasing in appearance while also performing a utility function, in that, it may be used to transport cargo such as ladders, kayaks, lumber, etc. and still have full truck bed capacity.

The present invention has benefits not present in other truck bed racks in that the present invention is easy and efficient for loading, unloading and securing cargo, puts less strain on the user by providing shoulder level side access for loading, and through a conventional rotating hinge mechanism utilizes leverage and gravity of the cargo to close and secure in a travel/stow position. The present invention can also be assembled and disassembled easily by one person and stored in a compact fashion.

By changing minimal hardware, the mounting position on the inverted "U" and adding "rain gutter" clamps, one could use easily adapt the present invention to have the same utility for vans and sports utility vehicles.

It to be understood that only preferred depictions of the present invention have been described and that numerous substitutions, modifications, and alterations are allowable within the scope of the following claims.

What is claimed is:

1. A rack for hauling cargo, said rack comprising
   (I) a front vertical post and a back vertical post, each said vertical post having a near end and a distal end, each said vertical post being capable of being pivotally mounted at the distal end, to the top of a side wall of the bed of a truck;
   (II) a carrier segment, said carrier segment comprised of a rectangular frame comprising an inside long rail and an outside long rail, each said rail having a back end and a front end and a horizontal plane each said long rail being attached in the horizontal plane with a front end rail and a back end rail; said carrier being attached adjacent the back end of the long outside rail adjacent the near end of the back vertical post and attached adjacent the outside long rail front end with the near end of the front vertical post;
   there being mounted on top of the outside long rail, near the point of the attachment of the front vertical post and the back vertical post to the outside carrier rail,
   (III) a shelf rack rail mounted essentially perpendicular to the plane of the carrier segment.

2. In combination, a set of racks as claimed in claim 1 that are mounted to the top of opposed side walls of a truck and that oppose each other in position to constitute a left rack and a right rack.

3. In combination, a set of racks as claimed in claim 2 and a set of self-supporting stabilizer units, said stabilizer units comprised of a set of front vertical stabilizer bars and a set of back vertical stabilizer bars, each said vertical stabilizer bar having a near end and a distal end, the front stabilizer bars being mounted at the distal end, to the top of a side wall of a bed of a truck, the back vertical stabilizer bars being removably mounted at the distal end, to the top of a side wall of the bed of a truck;

the front stabilizer bars being attached, at their respective near ends, to each other by a first horizontal cross bar therebetween;

said back stabilizer bars being attached at the near end to each other by a second horizontal crossbar therebetween.

4. A method of unobstructive loading of cargo on a truck, the truck having a set of racks for hauling cargo, said rack comprising;

(I) a front vertical post and a back vertical post, each said vertical post having a near end and a distal end, each said vertical post being capable of being pivotally mounted at the distal end, to the top of a side wall of the bed of a truck;

(II) a carrier segment, said carrier segment comprised of a rectangular frame comprising an inside long rail and an outside long rail, each said rail having a back end and a front end each said long rail being attached in the same plane with a front end rail and a back end rail; said carrier being attached near the back end of the long outside rail near the near end of the back vertical post and attached near the outside long rail front end with the near end of the front vertical post;

there being mounted on top of the outside long rail, near the point of the attachment of the front vertical post and the back vertical post to the outside carrier rail, (m) a shelf rack rail mounted essentially perpendicular to the plane of the carrier segment;

that are mounted to the top of opposed side walls of a truck and that oppose each other in position to constitute a left rack and a right rack; a set of self-supporting stabilizer units, said stabilizer units comprised of a set of front vertical stabilizer bars and a set of back vertical stabilizer bars, each said vertical stabilizer bar having a near end and a distal end, the front stabilizer bars being mounted at the distal end, to the top of a side wall of a bed of a truck, the back vertical stabilizer bars being removably mounted at the distal end, to the top of a side wall of the bed of a truck;

the front stabilizer bars being attached, at their respective near ends, to each other by a first horizontal cross bar therebetween;

said back stabilizer bars being attached at the near end to each other by a second horizontal crossbar therebetween;

the method comprising:

A. unlocking the restraining system from the racks;
B. lowering the racks from a vertical position;
C. removing the back stabilizer bar;
D. loading the bed of the truck with cargo;
E. raising the racks to a vertical position and locking said racks in place;
F. optionally loading cargo on the rack.

5. A method of unobstructive loading of cargo on a truck, the truck having the rack for hauling cargo, said rack comprising:

(I) a front vertical post and a back vertical post, each said vertical post having a near end and a distal end, each said vertical post being capable of being pivotally mounted at the distal end, to the top of a side wall of the bed of a truck;

(II) a carrier segment, said carrier segment comprised of a rectangular frame comprising an inside long rail and an outside long rail, each said rail having a back end and a front end each said long rail being attached in the same plane with a front end rail and a back end rail; said carrier being attached near the back end of the long outside rail near the near end of the back vertical post and attached near the outside long rail front end with the near end of the front vertical post;

there being mounted on top of the outside long rail, near the point of the attachment of the front vertical post and the back vertical post to the outside carrier rail, (III) a shelf rack rail mounted essentially perpendicular to the plane of the carrier segment;

installed thereon, the method comprising:

A. unlocking the restraining system from the rack;
B. lowering the rack from a vertical position;
C. loading the bed of the truck with cargo;
D. raising the rack to a vertical position and locking said rack in place;
E. optionally loading cargo on the rack.

6. A method of unobstructive unloading of cargo from a truck, the truck having a rack for hauling cargo, said rack comprising:

(I) a front vertical post and a back vertical post, each said vertical post having a near end and a distal end, each said vertical post being capable of being pivotally mounted at the distal end, to the top of a side wall of the bed of a truck;

(II) a carrier segment, said carrier segment comprised of a rectangular frame comprising an inside long rail and an outside long rail, each said rail having a back end and a front end each said long rail being attached in the same plane with a front end rail and a back end rail; said carrier being attached near the back end of the long outside rail near the near end of the back vertical post and attached near the outside long rail front end with the near end of the front vertical post;

there being mounted on top of the outside long rail, near the point of the attachment of the front vertical post and the back vertical post to the outside carrier rail, (III) a shelf rack rail mounted essentially perpendicular to the plane of the carrier segment installed thereon, the method comprising:

A. unloading any cargo from the rack;
B. unlocking the restraining system from the rack;
C. lowering the rack from a vertical position;
D. unloading the cargo from the bed of the truck.

7. A method of unobstructive unloading of cargo from a truck, the truck having a rack for hauling cargo, said rack comprising (I) a front vertical post and a back vertical post, each said vertical post having a near end and a distal end, each said vertical post being capable of being pivotally mounted at the distal end, to the top of a side wall of the bed of a truck;

(II) a carrier segment, said carrier segment comprised of a rectangular frame comprising an inside long rail and an outside long rail, each said rail having a back end and a front end each said long rail being attached in the same plane with a front end rail and a back end rail; said carrier being attached near the back end of the long outside rail near the near end of the back vertical post and attached near the outside long rail front end with the near end of the front vertical post;

there being mounted on top of the outside long rail, near the point of the attachment of the front vertical post and the back vertical post to the outside carrier rail, (III) a shelf rack rail mounted essentially perpendicular to the plane of the carrier segment;

that are mounted to the top of opposed side walls of a truck and that oppose each other in position to constitute a left rack and a right rack installed thereon, the method comprising:

A. unloading any cargo from the racks;
B. unlocking the restraining system from the racks;
C. lowering the racks from a vertical position;
D. unloading the cargo from the bed of the truck.

* * * * *